(12) United States Patent
Harris (10) Patent No.: US 7,866,242 B1
(45) Date of Patent: Jan. 11, 2011

(54) NOISE DAMPENER HUB ASSEMBLY FOR A CIRCULAR SAW

(76) Inventor: K. Michael Harris, 7343 El Camino Real #319, Atascadero, CA (US) 93422

(*) Notice: Subject to any disclaimer, the term of this patent is extended or adjusted under 35 U.S.C. 154(b) by 1955 days.

(21) Appl. No.: 10/126,678

(22) Filed: Apr. 19, 2002

(51) Int. Cl.
*B26D 7/26* (2006.01)

(52) U.S. Cl. .................... 83/698.41; 83/666

(58) Field of Classification Search ............ 83/665, 83/666, 676, 698.41, 664; 125/13.01, 15; 451/342, 359, 360
See application file for complete search history.

(56) References Cited

U.S. PATENT DOCUMENTS

| | | | | |
|---|---|---|---|---|
| 173,126 A * | 2/1876 | Little | .................... | 83/666 |
| 566,883 A * | 9/1896 | Higgins | .................... | 451/342 |
| 927,145 A * | 7/1909 | Hyde | .................... | 451/342 |
| 1,110,736 A * | 9/1914 | Austin | .................... | 83/666 |
| 1,947,662 A * | 2/1934 | Robinson | .................... | 451/342 |
| 1,958,694 A * | 5/1934 | Chandler | .................... | 83/660 |
| 2,748,820 A * | 6/1956 | Green et al. | .................... | 83/491 |
| 3,036,412 A * | 5/1962 | Tocci-Guilbert | .................... | 451/342 |
| 3,556,074 A * | 1/1971 | Nelke et al. | .................... | 125/13.02 |
| 3,762,008 A * | 10/1973 | Volki et al. | .................... | 125/13.02 |
| 3,900,071 A * | 8/1975 | Crawford | .................... | 172/15 |
| 4,083,279 A * | 4/1978 | Wester et al. | .................... | 83/347 |
| 4,102,230 A * | 7/1978 | Magnusson et al. | .................... | 83/835 |
| 4,249,441 A * | 2/1981 | Sturtz | .................... | 83/347 |
| 4,343,214 A * | 8/1982 | Schadlich | .................... | 83/543 |
| 4,407,178 A * | 10/1983 | Storzer | .................... | 83/835 |
| 4,461,195 A * | 7/1984 | Barnick | .................... | 82/158 |
| 4,549,372 A * | 10/1985 | Sexton et al. | .................... | 451/541 |
| 4,584,920 A * | 4/1986 | Jansen-Herfeld | .................... | 83/838 |

(Continued)

FOREIGN PATENT DOCUMENTS

JP 57054079 A * 3/1982

(Continued)

OTHER PUBLICATIONS

Blue Forge Games, "Yamato Macross Plus", Dec. 26, 2005, p. 3.*

(Continued)

*Primary Examiner*—Kenneth E. Peterson
*Assistant Examiner*—Sean Michalski
(74) *Attorney, Agent, or Firm*—Knobbe Martens Olson & Bear LLP (57) ABSTRACT

A noise dampener hub assembly for mounting a circular blade on the drive shaft of a circular saw including a spindle hub assembly having an inside noise dampener disc member, a separate outside noise dampener disc member and a spanner hub. The tubular hub member is externally threaded and the spanner hub is internally threaded so that they can be screwed together. The respective inner surfaces of the inside noise dampener disc member and the outside noise dampener disc member have radially spaced annular grooves that removably receive respective O-rings which dampen the noise produced during operation of the circular saw. A pair of pins extend outwardly from the inside noise dampener disc and pass through aligned apertures in the circular saw blade. These pins have different diameters for telescoping into the respective different sized alignment apertures. Also the respective pins and apertures are oriented 170° from each other so that the circular saw blade will always be installed at the same position.

11 Claims, 8 Drawing Sheets

U.S. PATENT DOCUMENTS

| | | | | |
|---|---|---|---|---|
| 4,657,428 A | * | 4/1987 | Wiley | 403/359.3 |
| 4,706,386 A | * | 11/1987 | Wiley | 30/388 |
| 4,729,193 A | * | 3/1988 | Gant et al. | 451/342 |
| 4,732,337 A | * | 3/1988 | Knecht | 241/292.1 |
| 4,850,109 A | * | 7/1989 | Kerwin | 30/122 |
| 5,027,684 A | * | 7/1991 | Neukam | 83/481 |
| 5,146,832 A | * | 9/1992 | Wilson et al. | 83/698.91 |
| 5,366,312 A | * | 11/1994 | Raines | 403/3 |
| 5,953,807 A | * | 9/1999 | Garand | 29/464 |
| 6,030,326 A | * | 2/2000 | Azuma et al. | 483/31 |
| 6,325,127 B1 | * | 12/2001 | Waldrop | 156/510 |
| 6,609,426 B1 | * | 8/2003 | Altmann et al. | 73/715 |
| 2003/0075162 A1 | * | 4/2003 | Hamilton | 125/13.01 |

FOREIGN PATENT DOCUMENTS

JP    01078719 A   *   3/1989

OTHER PUBLICATIONS

Magrab, Edward B. Integrated Product and Process Design and Development. Copyright 1997 by CRC Press LLC Boca Raton, FL. pp. 144, 240, 245 and 247.*

* cited by examiner

NOISE DAMPENER HUB ASSEMBLY FOR A CIRCULAR SAW

BACKGROUND OF THE INVENTION

The invention relates to a hub assembly and more specifically to a noise dampener assembly for mounting a circular blade on the drive shaft of a circular saw. The noise dampener hub assembly is particularly beneficial when used in cutting large format tile and slab stone.

In the past, the power source for small sawing systems was an electric motor using a V-belt and/or direct drive that turns a diamond rimmed cutting disc. The trend to use small tile and stone saws for cutting stone is to use a circular saw having a rotating cutting disc. The new trend is to use a mass-produced small tool that incorporates an electric motor and a worm or helical gear reduction such as a worm drive "skill saw design." Another popular power source is a hand held grinder, again incorporating a small motor and reduction gear. These power units are now being used in many tile and stone saws for the power source. These mass-produced portable saws and grinders are used for the following reasons: 1) a low cost and reliable power source, 2) a very desirable weight to a torque ratio in a small portable package and 3) a power source that can be quickly changed if defective or worn out.

A major concern in the industry is the noise intensity produced during cutting operations on tile and stone. As the operator of a saw is continually exposed to the loud noise of the cutting operation, over time, it will cause a hearing problem.

Attempts have been made to reduce the sound intensity of the circular diamond blade. There is an Italian diamond blade on the market that has reduced some of the intensity of the sound during the cutting operation. The sound reduction in this design is accomplished by two methods. First, there is a series of laser cuts through the matrix on the outer rim of the blade and proceeding for a distance into the core of the blade. These "fine kerf" cuts proceed around the perimeter of the blade. This technology dampens the vibration or harmonics in the core of the blade. The second form of technology that dampens the harmonics or vibration in the core of the blade is that the core itself is a laminated disc. The disc is actually two pieces of metal laminated together with a copper or soft bond such as a copper amalgam. These combined features provide an improved reduction in decibel levels.

It is an object of the invention to reduce the overall sound produced by the radial diamond saw blades, especially with a higher percentage of noise reduction in the high pitch decibel range.

It is also an object of the invention to produce a novel noise dampener hub assembly that will result in a significant reduction in shop noise fatigue.

It is another object of the invention to provide a novel noise dampener hub assembly that can be used to provide a dramatic reduction in vibration in core deflection of the radial saw blades.

It is an additional object of the invention to provide a novel noise dampener hub assembly that produces a very noticeable increase in the blade life and which also produces a decrease in premature diamond loss from the blade.

Another problem that exists in the industry is created by the fact that diamond rimed circular discs are never perfectly round. The cost of the blade often reflects the quality assurance if regarding the consistent roundness of the blade. Most of the inexpensive power supplies have inherent "run-out" on spindle rotation. Thus the spindle run-out and the blade being out-of-round results in what is called a "wear-in process," in other words, "truing up" of the blade. From then on, if the blade is not removed or its position is unchanged relative to the spindle, the blade will have a normal functional life. When an operator wants to cut another type of stone, he usually has to change blades. When the original blade is remounted, the exact spindle location from the "wear-in process" is lost. Thus, the "wear-in process" has to start over again. On small portable hand cutting machines no provision is made for a blade to be mounted to the power spindle in the exact position each time. Thus, premature blade wear is experienced.

It is an object of the invention to provide a noise dampener hub assembly that will allow a blade to be removed and replaced in such a manner that it is always in the exact same position that it was originally in the noise hub assembly.

SUMMARY OF THE INVENTION

The novel noise dampener hub assembly has combined features that collectively provide a dramatic improvement in the cutting operation of tile and stone. These results are directly related to the enhanced performance of the cutting disc or blade. Additionally, a substantial monetary savings is realized by the end user.

The noise dampener hub assembly has an inside noise dampener disc member and an outside noise dampener disc member that clamp a cutting disc or blade between them. Each of the noise dampener disc members has a pair of radially spaced annular grooves on their inner surface that removably receive resilient or compressible O-rings. When the respective noise dampener disc members are tightened into a firm engagement position against the opposite sides of the circular cutting blade, they add substantial stability to the blade as it is revolving. They also reduce the vibration that would travel from the cutting blade to the drive shaft or spindle of the circular saw. There is a substantial reduction in the noise level that would be produced during a cutting procedure, it is often as high as a 40° reduction in noise. This provides a significant reduction in shop noise fatigue for the workers. The dramatic reduction in vibration and core deflection by the inside and outside noise dampener disc members also provide a very noticeable increase in blade life and a decrease in premature diamond loss on the cutting blades.

In the principal version of the noise dampener hub assembly the tubular hub member is integrally formed with the inside noise dampener disc member. The inner surface of the inside noise dampener disc member has a pair of pins extending outwardly perpendicular to its surface. These pins have different diameters and also they are not diametrically opposed to each other, but instead are 170° apart. The mating outside noise dampener disc member has a pair of different sized apertures to receive the different sized pins. Also since the apertures are spaced 170° apart, this insures that the disc or cutting blade cannot be improperly mounted or mounted backwards. This is a dramatic improvement over prior art. An operator mounting a blade backwards is a very common problem. Only a trained eye can determine the proper blade position by viewing the diamonds on the matrix on the blade. Most blade manufacturers include a direction arrow on the blade core, but it is often small and difficult to see. An added benefit is the fact that the blade will be placed in the same exact position relative to the spindle hub or drive shaft throughout the life of the blade. The operator can remove the spanner nut on the spindle hub and take the blade off and on and the blade will automatically be placed in the same exact position as when it was previously mounted on the saw. There is no premature diamond loss, due to a "wear-in" process, because the blade is replaced in the exact same position each time. Also the spanner hub cannot over tighten itself during operation since the blade cannot move from startup torque blade friction due to the two pins holding the blade in a fixed position.

DESCRIPTION OF THE PREFERRED EMBODIMENT

Figure 1:
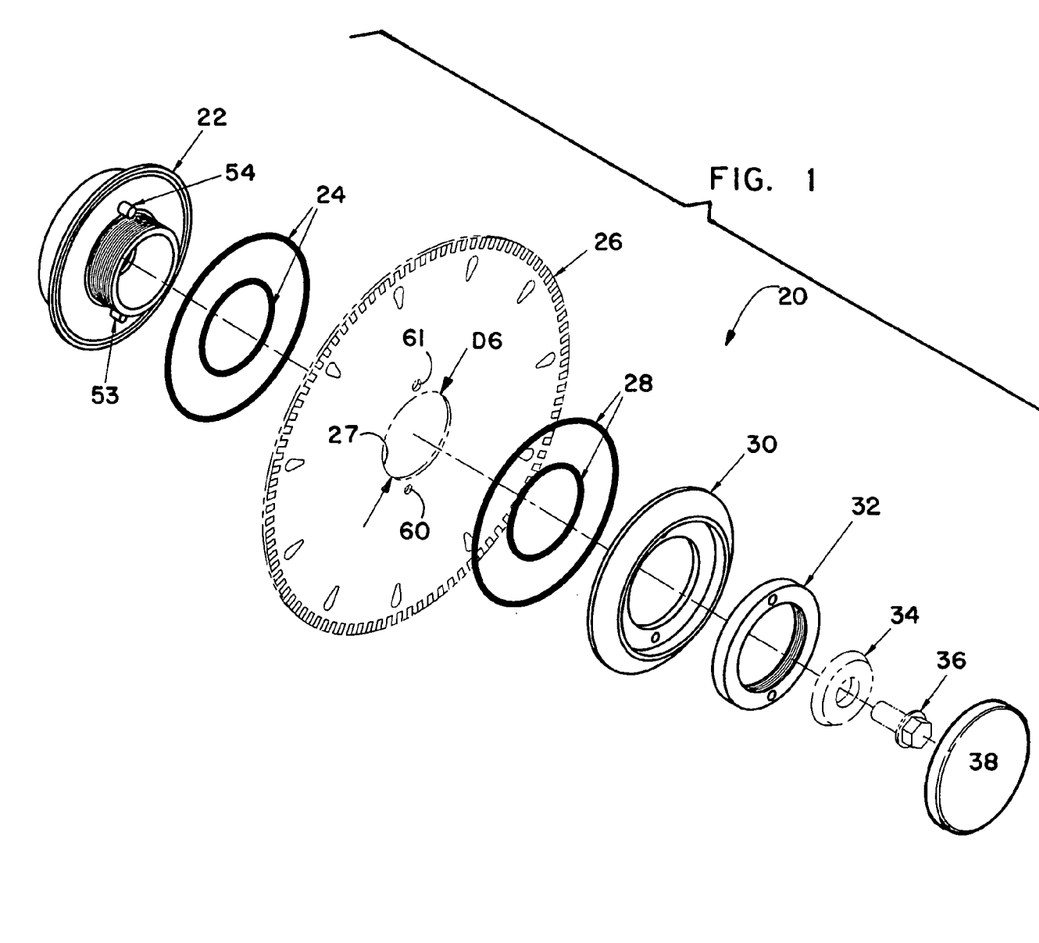
FIG. 1 is an exploded front perspective view of the noise dampener hub assembly.

A noise dampener hub assembly for mounting a circular blade on the drive shaft of a circular saw is generally designated numeral 20. It is illustrated in FIGS. 1-8 of the drawings. The noise dampener hub assembly is illustrated in FIG. 1 in an exploded front perspective view. It has a spindle hub 22, a pair of radially spaced O-rings 24, a circular saw blade 26, (having a bore hole 27 having a diameter D6) a pair of radially spaced O-rings 28, an outside noise dampener disc member 30, a spanner hub 32, a splined washer 34, a bolt 36, and a cover cap 38.

Figure 2:
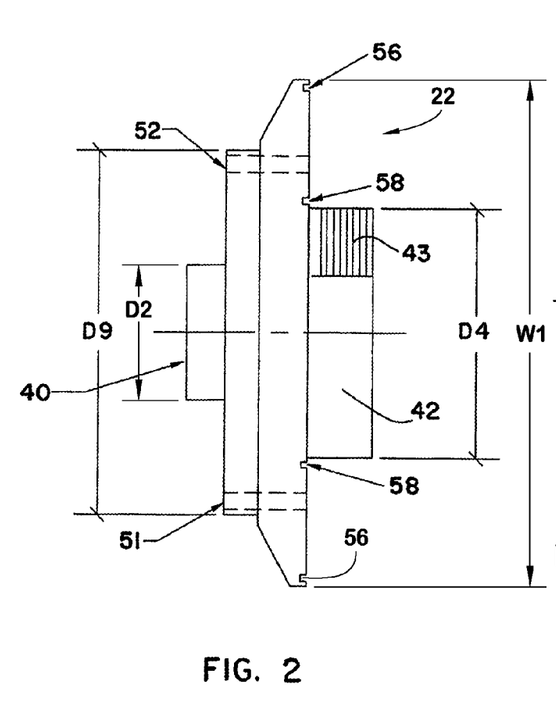
FIG. 2 is a side elevation view of the spindle hub.
Figure 3:
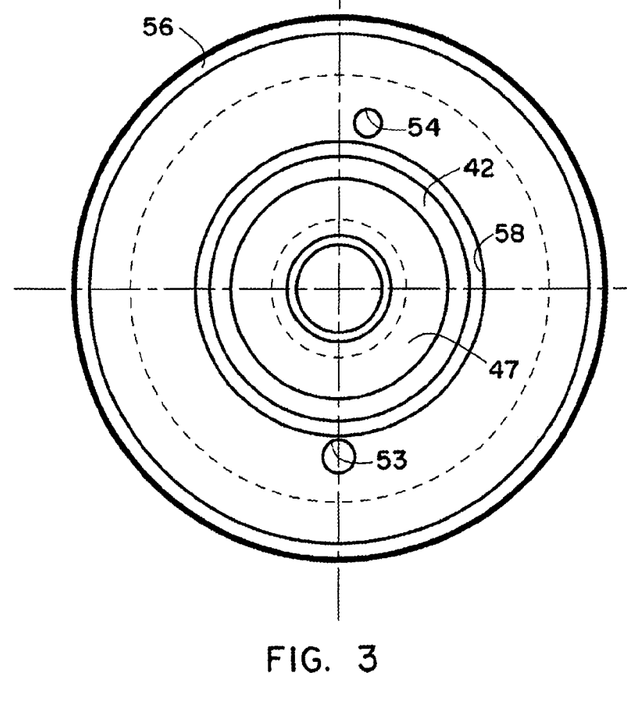
FIG. 3 is a rear elevation view of the spindle hub.
Figure 4:
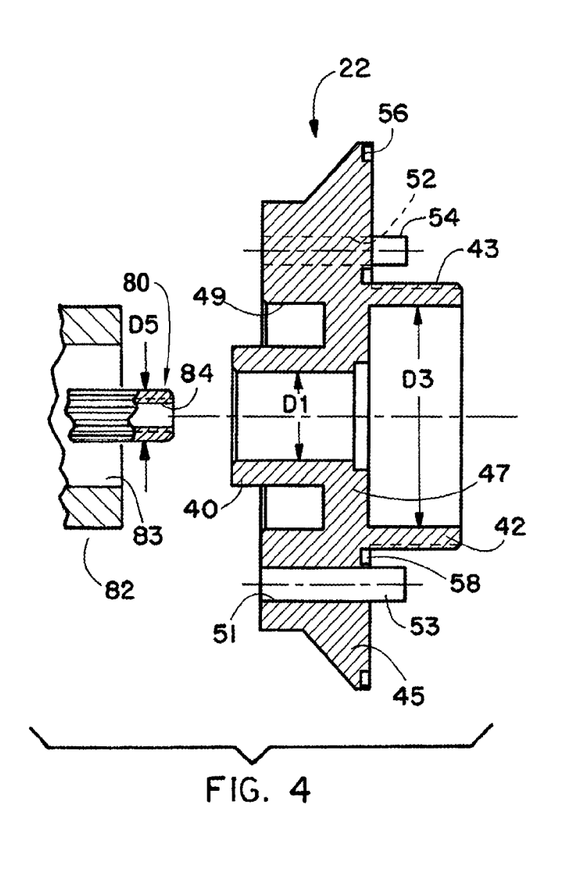
FIG. 4 is a vertical cross sectional view of the spindle hub.

Spindle hub 22 is best understood by referring to FIGS. 2-4. It has a tubular sleeve member 40 having an inside diameter D1 and an outside diameter D2. It also has a tubular hub member 42 having an inside diameter D3 and an outside diameter D4. It has external lefthand threads 43. Spindle hub 22 also has an inner noise dampener disc member 45. Tubular sleeve member 40 is connected at its rear end to the rear end of hub member 42 by disc portion 47. Hub member 42 is also connected to inside noise dampener disc member 45 (having an outer diameter W1) by disc portion 47. An annular channel 49 in the front of spindle hub 22 has a purpose that will be described later. A pair of bore holes 51 and 52 extend through inside noise dampener disc member 45. Bore hole 51 is larger than bore hole 52 and it receives a larger diameter pin 53. The smaller diameter pin 54 is received in bore hole 52. An outer annular groove 56 and an inner annular groove 58 are formed on the inner surface of inside noise disc member 45. The O-rings 24 are removably engaged in the respective annular grooves.

Alignment pins 53 and 54 are spaced from each other 170°. Circular saw blade 26 has aligned apertures 60 and 61 that are spaced from each other 170 degrees and these apertures also are also substantially equal to the diameter of the respective pins 53 and 54 so that the circular saw blade 26 can only be attached to spindle hub 22 in a single position. If the circular saw blade 26 is reversed, its apertures 60 and 61 would not align with the pins 53 and 54.

Figure 5:
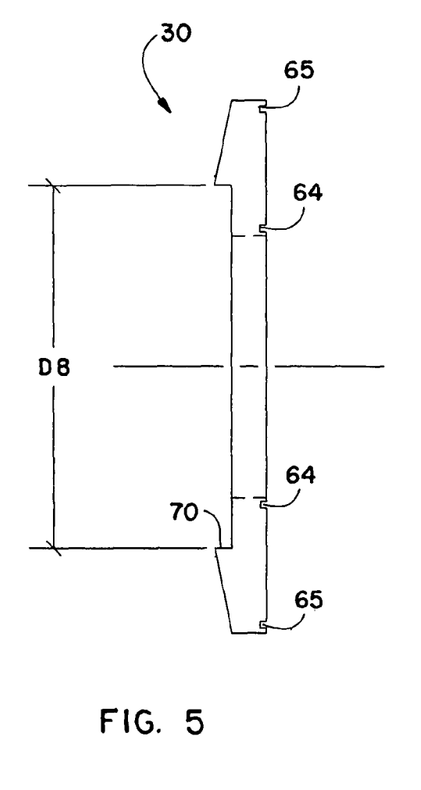
FIG. 5 is a side elevation view of the outside noise dampener disc member.
Figure 6:
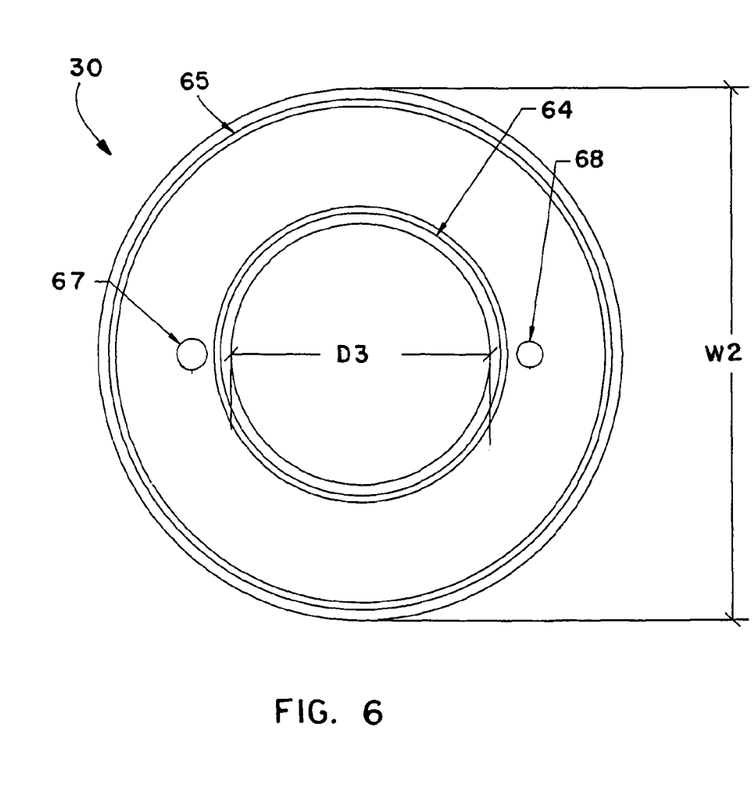
FIG. 6 is a rear elevation view of the outside noise dampener disc member.

Outside noise dampener disc member 30 has an outer diameter W2 is best described by referring to FIGS. 5 and 6. It has an inner annular groove 64 and an outer annular groove 65 on its inner surface. A pair of O-rings 28 are removably received in the respective grooves 64 and 65. A pair of bore holes 67 and 68 are oriented 170° from each other and the size of the respective bore holes is such that they only will receive pins 53 and 54 if the outside noise dampener disc member 30 is properly oriented. A recess 70 having a diameter D8 is formed in the outer surface of outside noise disc dampener 30 and spanner hub 32 will nest therein when it is threaded onto hub member 42.

Figure 7:
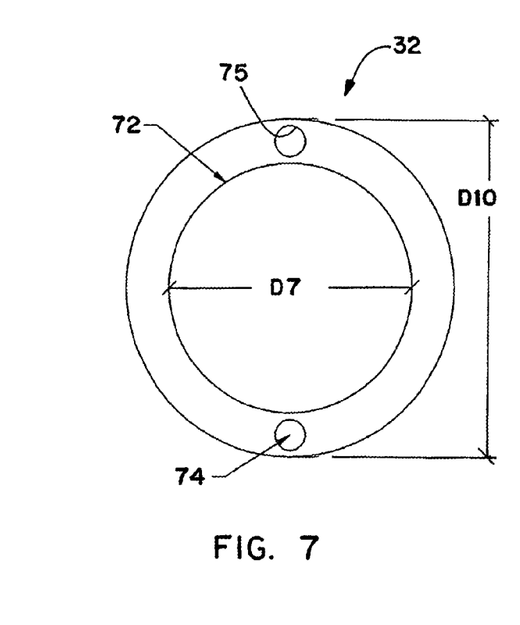
FIG. 7 is a front elevation view of the spanner hub.
Figure 8:
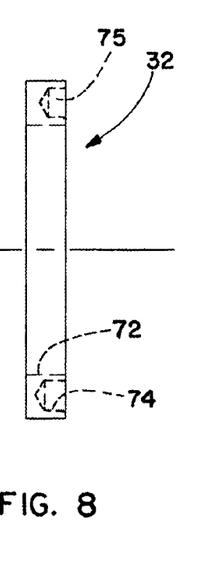
FIG. 8 is a side elevation view of the spanner hub.

Spanner hub 32 has an inside diameter D7 as shown in FIGS. 7 and 8. It also has internal left hand threads 72. A pair of recesses 74 and 75 are formed in the front surface of spanner hub 32 for receiving a spanner wrench that would be used for tightening the spanner hub onto the hub member 42.

In FIG. 4, a drive shaft or spindle 80 of a circular saw has an external diameter D5 that is slightly less than the internal diameter D1 of tubular sleeve 40. This allows spindle hub 22 to be telescopically mounted thereon. The drive shaft 80 has an annular recess 83 around it inside tubular sleeve 82 of the circular saw. The outer surface of drive shaft 80 may be splined and it also has an internally threaded bore 84 in its front end. These threads would be lefthand threads and bolt 36 would also have left hand threads. Splines washer 34 would mate with the splines on the outer surface of drive shaft 80.

Figure 9:
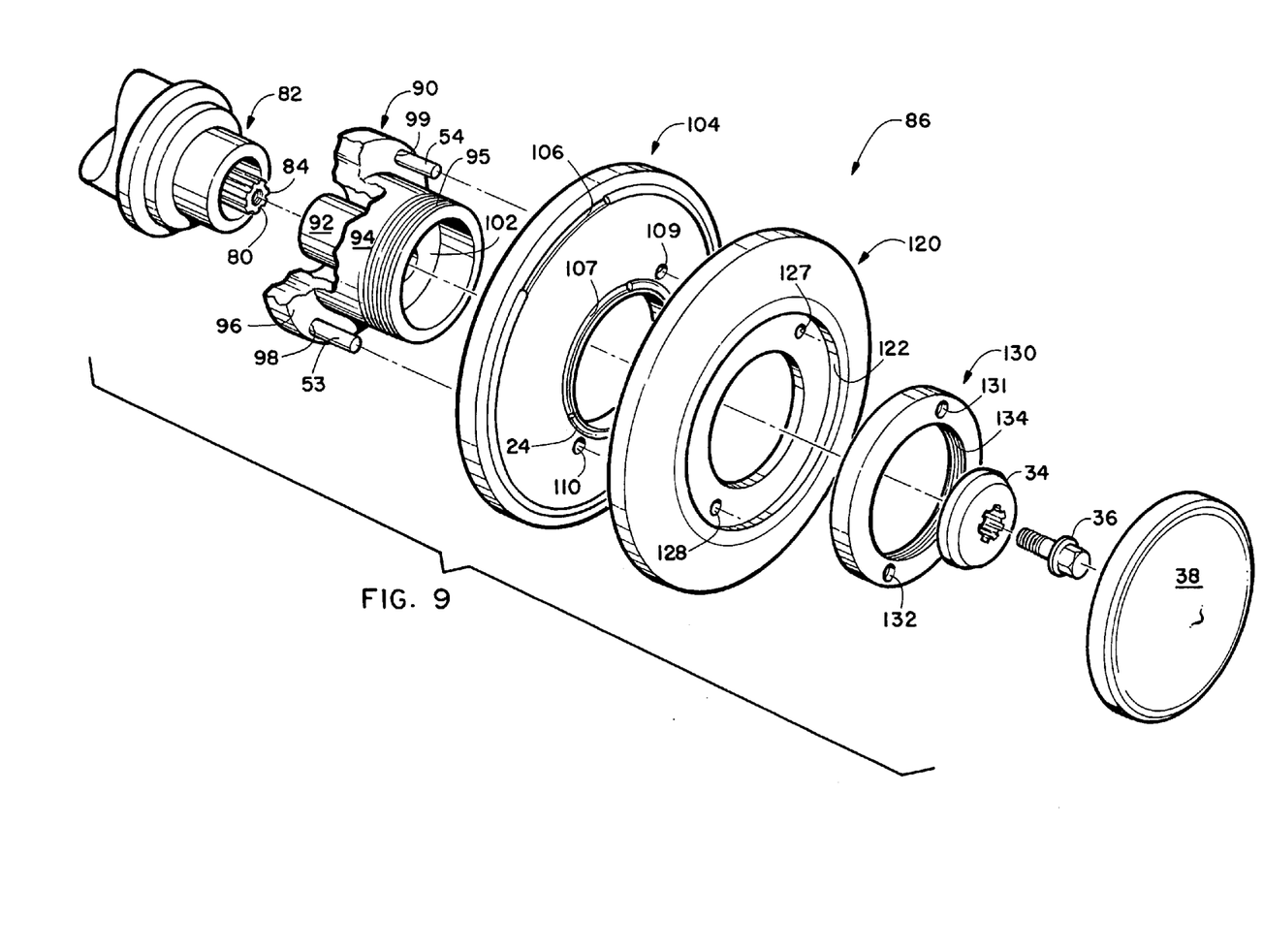
FIG. 9 is an exploded front perspective view of the rear end of the driveshaft of a circular saw and a first alternative embodiment of the noise dampener hub assembly.
Figure 10:
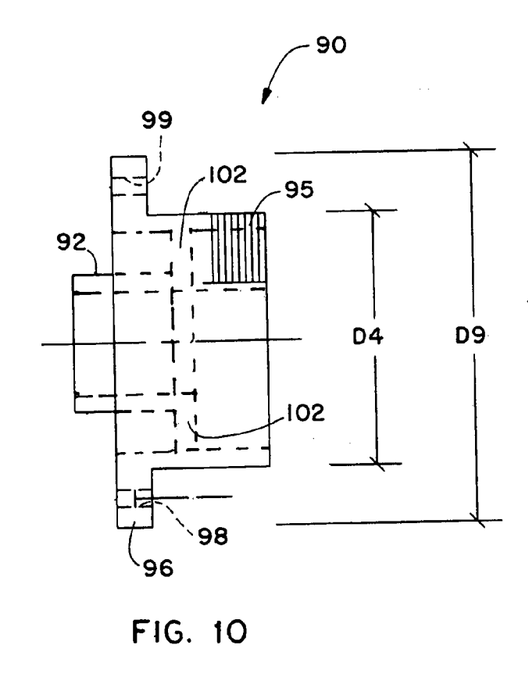
FIG. 10 is a side elevation view of the spindle hub of the first alternative embodiment of the noise dampener hub assembly.

An alternative embodiment of the noise dampening hub assembly has its components illustrated in FIGS. 9-16. The alternative noise dampener hub assembly 86 would be installed on the drive shaft 80 of a circular saw in the same manner as previously described. FIGS. 9 and 10 illustrate a spindle hub 90 having a tubular sleeve member 92 and a hub member 94. Spindle hub 90 has an outer diameter D9. Hub member 94 has external left hand threads 95. A flange 96 is formed on the rear end of hub member 94. A pair of bore holes 98 and 99 are formed in flange 96 for receiving pins 53 and 54 such as described in the previously described noise dampener hub assembly. A disc member 102 connects the rear end of hub member 95 to the inner end of tubular sleeve member 92.

Figure 11:
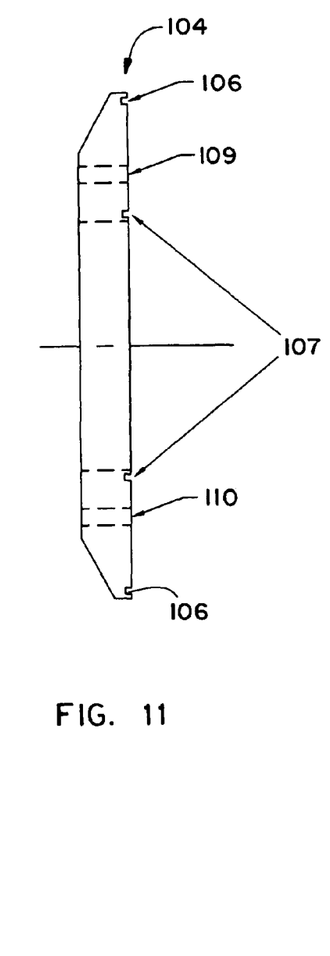
FIG. 11 is a side elevation view of the inside noise dampener disc member of the first alternative embodiment.
Figure 12:
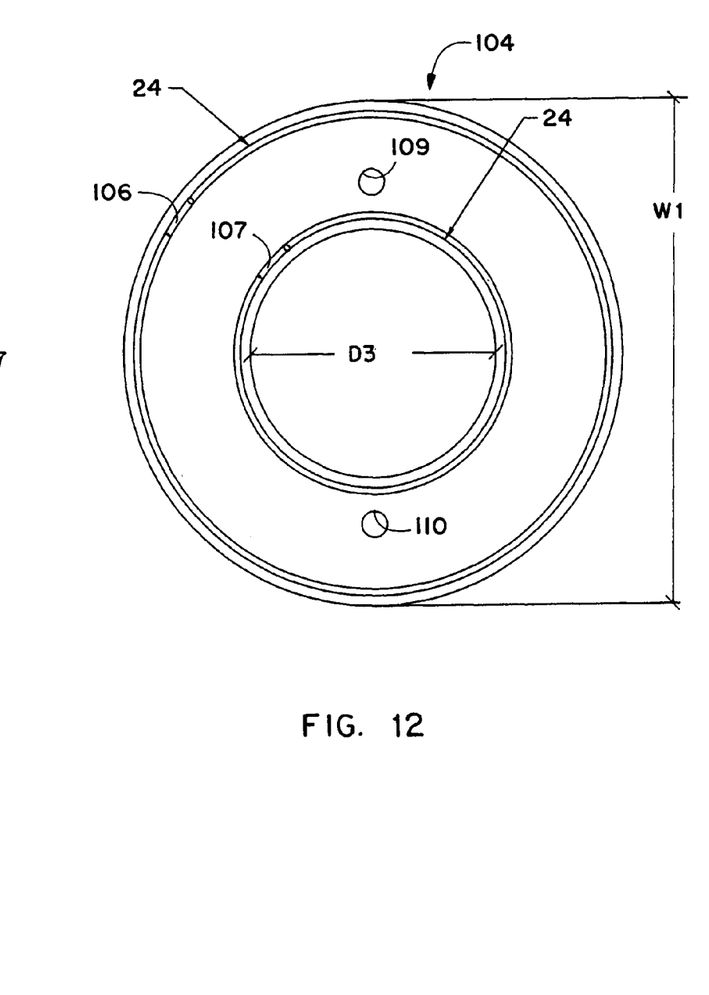
FIG. 12 is a rear elevation view of the inside noise dampener disc member illustrated in FIG. 11.

An inside noise dampener disc member 104 is illustrated in FIGS. 11 and 12. It has radially spaced annular grooves 106 and 107 on its inner surface for removably receiving a pair of O-rings 24. Apertures 109 and 110 allow the respective pins 54 and 53 to pass therethrough.

Figure 13:
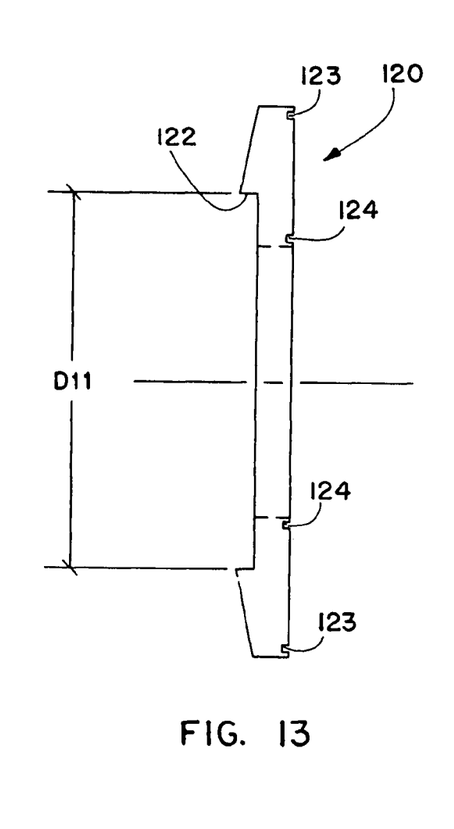
FIG. 13 is a side elevation view of the outside noise dampener disc member of the first alternative embodiment.
Figure 14:
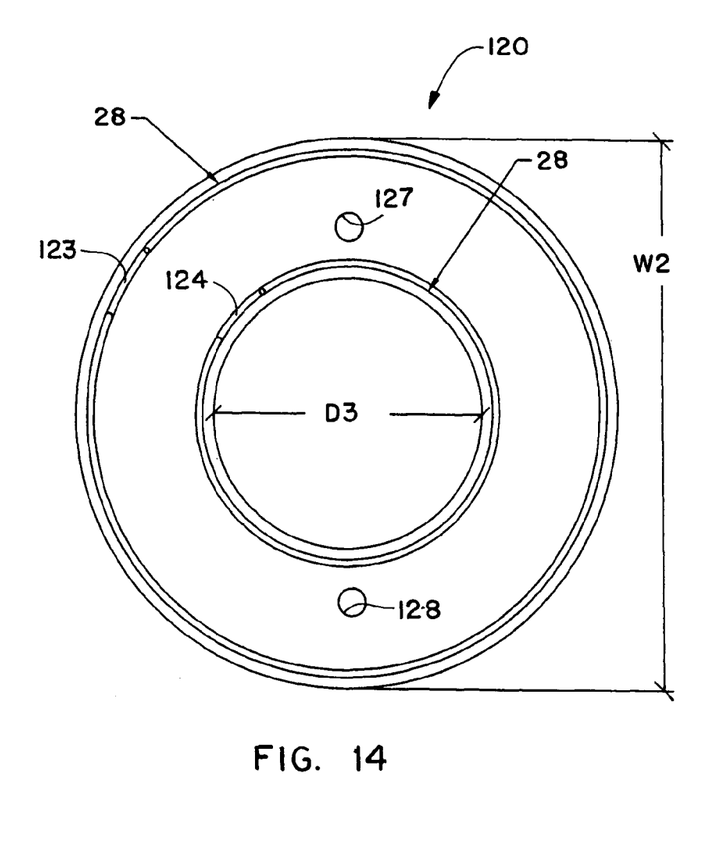
FIG. 14 is a rear elevation view of the outside noise dampener disc member illustrated in FIG. 13.
Figure 15:
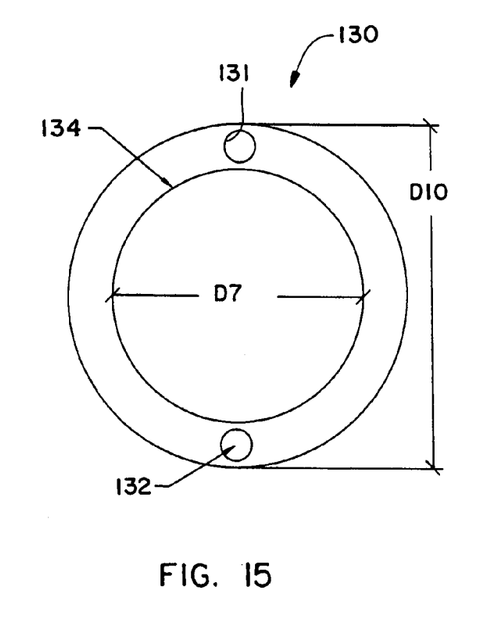
FIG. 15 is a front elevation view of the spanner hub for the first alternative embodiment of the noise dampener hub assembly.
Figure 16:
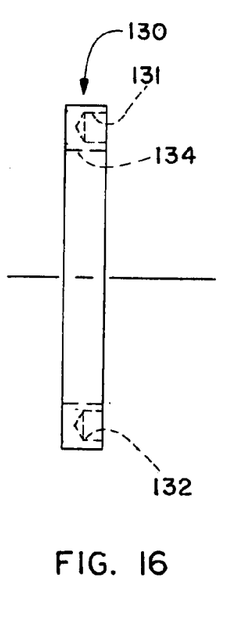
FIG. 16 is a side elevation view of the spanner hub illustrated in FIG. 15.

An outside noise dampener disc member 120 is illustrated in FIGS. 13 and 14. Apertures 127 and 128 allow the respective pins 54 and 53 to pass therethrough. It has a recess 122 having a diameter D11 formed in its outer surface into which spanner hub 130 having an outer diameter D10 will nest once it is screwed onto hub member 94. A pair of radially spaced annular grooves 123 and 124 are formed on the inner surface of outside noise dampener disc dampener 120 for removably receiving O-rings 28. The spanner hub 130 for this embodiment is illustrated in FIGS. 15 and 16. It has a pair of recesses 131 and 132 for removably receiving a spanner tool and internal left hand thread 134.

What is claimed is:

1. A circular saw blade assembly including a noise dampener hub assembly mounting a one-part disc circular blade having a cutting portion on the exterior periphery of said disc on the drive shaft of a circular saw comprising:
   a metal circular saw blade;
   an inside noise dampener disc having an inner surface and an outer surface;
   an outside noise dampener disc having an inner surface and an outer surface;
   a first pair of radially spaced noise dampening resilient rings positioned on said inner surface of said inside noise dampener disc contacting one of the sides of the metal circular saw blade; and
   a second pair of noise dampening resilient rings positioned on said inner surface of said outside noise dampener disc contacting the other one of the sides of the metal circular saw blade.

2. A circular saw blade assembly as recited in claim 1 wherein said first pair of noise dampening resilient rings are made of compressible material and said second pair of noise dampening resilient rings are made of compressible material.

3. A circular saw blade assembly as recited in claim 1 wherein said first pair of noise dampening resilient rings are O-rings and said second pair of noise dampening resilient rings are O-rings.

4. A circular saw blade assembly as recited in claim 3 wherein said inner surface of each of said inside and outside noise dampener discs includes a pair of grooves capturing said respective first and second pairs of O-rings.

5. A circular saw blade assembly as recited in claim 1 wherein said first pair of radially spaced noise dampening resilient rings is captured on said inner surface of said inside noise dampener disc member and said second pair of radially spaced noise dampening resilient rings is captured on said inner surface of said outside noise dampener disc.

6. A circular saw blade assembly as recited in claim 1 further comprising a tubular hub member extending through a central aperture in the metal circular saw blade and a pin extending between said inside and outside noise dampening disks mounting the metal circular saw blade at the same position on said tubular hub member every time the metal circular saw blade is removed and later remounted.

7. A circular saw blade assembly as recited in claim 6 wherein said pin is positioned on said inside and outside noise dampening disks to pass through an alignment aperture in the metal circular saw blade.

8. A circular saw blade assembly as recited in claim 7 wherein there are two of said pins having different cross sections mating with complementary alignment apertures in said metal circular saw blade.

9. A circular saw blade assembly as recited in claim 8 wherein said two pins are positioned at non-diametrical positions that prevent the metal circular saw blade from being mounted backward.

10. A circular saw blade assembly as recited in claim 1, wherein the metal circular saw blade comprises a thin metal disc.

11. A circular saw blade assembly as recited in claim 10, wherein the thin metal disk is diamond rimed.

* * * * *